April 3, 1956   D. R. HARWIN ET AL   2,740,739
CARPET UNDERLAY
Filed Dec. 27, 1952
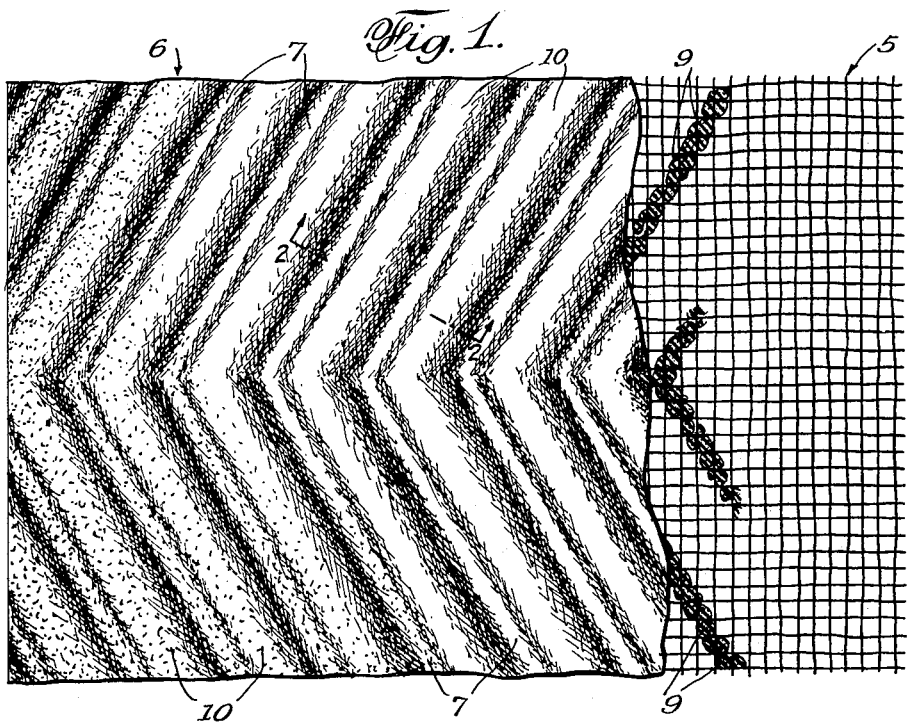
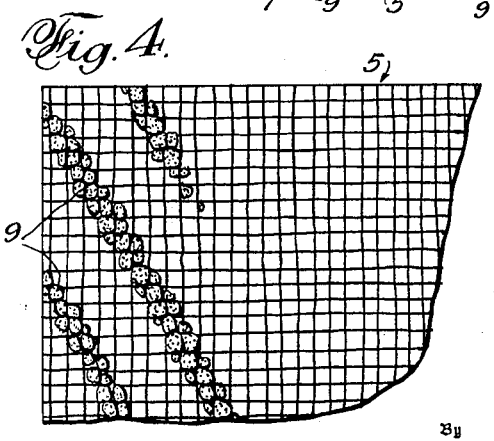
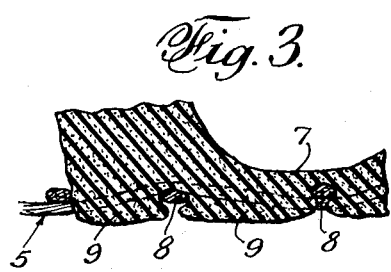
Inventors
DIXON R. HARWIN
ALFRED STERN
VIRGIL H. BODLE
By C. G. Stratton
Attorney

United States Patent Office 2,740,739
Patented Apr. 3, 1956

2,740,739

CARPET UNDERLAY

Dixon R. Harwin, Alfred Stern, and Virgil H. Bodle, Los Angeles County, Calif., assignors to National Sponge Cushion Co., Inc., Los Angeles, Calif., a corporation of California Application December 27, 1952, Serial No. 328,186

4 Claims. (Cl. 154—49)

This invention relates to a carpet underlay or pad and, while more particularly adapted for use as an underlay to cushion carpets and rugs, the same is also adapted to be used as upholstering material, in the production of mattresses, padding for various purposes, cushions, etc.

Prior types of carpet underlay include jute pads with or without rubber sprayed thereon, similar pads made of cattle hair or a combination of cattle hair and jute, flat sponge rubber pads with or without fabric, flat latex sponge rubber, waffle-type sponge rubber with pre-cemented fabric on one side, embossed rubber sheets in which resiliency is imparted by the embossments, etc. The effectiveness as carpet underlay of these prior materials varied, some having desirable properties as well as those not to be desired. For instance, the fibrous pads were subject to mildew and/or becoming moth-eaten and also caused allergic discomfort to certain people; the flat sponge rubber pads, besides being quite expensive if formed of suitable thickness to be properly resilient, were too heavy and therefor difficult to handle; solid embossed rubber pads were also costly and heavy and, in addition, lacked porosity enabling drawing dust and dirt through them; etc.

Recognizing the different faults inherent in prior materials, it is an object of the present invention to provide carpet underlay that is shock-cushioning, long-wearing, comfortable in use, resists rug or carpet slippage, does not cause allergric reactions, eliminates damage by moths, mildew, etc., is easily handled, and, generally, is free of the different faults of prior underlay pads.

The present invention contemplates the provision of a carpet underlay comprised only of a large-mesh fabric backing and sponge rubber applied to and affixed to said fabric backing without adhesive, the rubber being so formed, during blowing and vulcanizing, that the same swells into a series of porous bulges and simultaneously effects key-locking engagement with the fabric by penetrating the interstices of the fabric to form knob-like heads larger than said interstices. It is another object of the invention to provide carpet underlay characterized by a key-locked connection of a fabric backing and sponge rubber substantially as defined above.

In order to improve the carpet-gripping properties of the underlay herein contemplated, it is a further object of the invention to form the sponge rubber bulges as a series of semi-tubular forms that are diagonally directed first in one direction and then in the other, alternately.

A still further object of the invention is to provide a carpet underlay, as above indicated, in which the semi-tubular forms of sponge rubber extend at an angle to the warp and weft of the fabric backing, whereby the mentioned key-locking heads of said rubber are more evenly distributed over the length and width of the fabric so that every warp and weft thread of the fabric has several points of interlocking engagement with the sponge rubber.

The invention also comprises novel details of construction and novel combinations and arrangements of parts, which will more fully appear in the course of the following description. However, the drawing merely shows and the following description merely describes one embodiment of the present invention which is given by way of illustration or example only.

In the drawing, like reference characters designate similar parts in the several views.

Fig. 1 is a top plan view of a relatively small portion of carpet underlay according to the present invention, a fragment of the sponge rubber thereof being removed to show, in cross-section, the interlock between said rubber and the fabric backing of the underlay.

Fig. 2 is a considerably enlarged fragmentary cross-sectional view as taken on line 2—2 of Fig. 1.

Fig. 3 is a further enlarged fragmentary cross-sectional detail view of a portion of Fig. 2 and particularly showing the interlocking feature of the underlay.

Fig. 4 is a fragmentary bottom plan view of the underlay showing the key-locking portions of the sponge rubber that penetrate the interstices of the fabric backing.

Referring now to the drawing, the present carpet pad or underlay comprises, generally, a fabric backing 5 and a top facing 6 of sponge rubber bonded to said backing in a manner and by means hereinafter described.

The fabric backing 5 is preferably in the form of a coarse-mesh material that may be termed net, since the interstices of the same are large relative to the thickness of the thread or yarn from which the fabric is woven. In the usual way, this net fabric has warp and weft threads that are, respectively, longitudinal and transverse to the length of the fabric to, thereby, eliminate longitudinal and transverse stretch of the fabric.

The fabric threads may be jute or a comparable material which, in practice, are woven to provide a mesh having about fourteen threads per inch. The thread count may vary, providing the interstices of the fabric are large enough to permit ample penetration of the sponge rubber therethrough.

With regard to the sponge rubber used to form top facing 6, it is deemed unnecessary to detail all of the different ingredients contained therein when initially compounded. For the purposes of this invention, it can be stated that the uncured rubber is compounded from raw rubber as it comes from the bale (the same being first softened, as by heat or in other ways), a blowing agent, accelerators, softening anti-oxidant, filler and sulphur.

Ordinary sponge rubber is compounded with a blowing agent, such as soda bicarbonate or sodium carbonate, or other like blowing agents, activated with various acids, such as stearic, oleic or acetic acid, in such manner that, under heat, the blowing of the sponge will take place first and vulcanization later. In order to enable the gases generated by the vulcanizing and blowing heat to more fully expand and seal, the present invention contemplates simultaneous or substantially simultaneous blowing and vulcanization by providing an excess of accelerator over the amount commonly used, and also a considerably larger amount of sulphur than is commonly used. In the present instance, at least 2% and as much as 3% of accelerator and 3.75% to 4% of sulphur in the rubber compound are used under heat ranging between 300° and 370° F. to obtain substantially simultaneous blowing and vulcanization of the sponge rubber.

In practice, a combination of what is known in the trade as Captax, Altax, Ledate and Aktone comprises the accelerator, the urea in Aktone causing uniform cells or pores in the sponge and also inducing slight vulcanization before blowing and full vulcanization occurs.

The crude rubber, compounded as above, is mixed in a Banbury machine to break the "nerve" of the crude rubber and obtain thorough homogeneity among the ingredients. The compound is then rolled out into a sheet about .050" thick in a conventional rubber mill. Of course, a coloring agent may be introduced in the compound if desired.

To form a carpet underlay according to the invention, the uncured sponge rubber sheet, as it comes from the rubber mill, is placed on a travelling mold and the net fabric 5 is placed thereover. A web is placed over the fabric and another beneath the mold. This five-ply assembly is then moved slowly between chests or platens heated to between 300° and 370° F. No pressure is applied, the heated platens being fixedly spaced.

The gases generated in the sponge rubber sheet cause expansion of said sheet to a thickness some ten times greater than the initial .050" thickness, except where the sheet is confined by the mold. At such points, indicated at 7, the rubber is held in intimate contact with fabric 5 and, in blowing or expanding, the rubber is forced to enter the interstices of the fabric, as best seen in Fig. 3, and swell around adjacent threads 8 of said fabric to form headed knob-like projections 9 that are somewhat larger in size than the areas of the fabric interstices. The web on that side limits such rising of the rubber so that the headed projections 9 are generally flattened, as shown. Thus, wherever the mold prevents expansion away from fabric 5, the rubber expands in the opposite direction through said fabric.

Between the points of engagement 7 of the rubber and the mold, as the rubber blows, the same expands into the mold cavities. Such expanding portions are shown at 10 and, in this instance, the same are in the form of semi-tubular portions that alternate with the points or areas 7. It is immaterial what the shape of the mold cavities is, providing the depth of the same is sufficient to accommodate the expanding rubber as it blows. The semi-tubular form shown is preferred because the same affords channels or passages 11 that permit free escape of the released gases. Also, because the semi-tubular forms can be arranged on a bias or diagonal to the weave of fabric 5, an efficient distribution of the projections 9 is afforded and the diagonal direction may be alternately changed to improve the carpet-gripping properties of the underlay.

Because of the porous nature of the sponge rubber and also because areas 7 are quite thin, the underlay thus produced can be kept clean by ordinary vacuum cleaners while such cleaners are vacuuming the rug or carpet overlaying the same.

While we have illustrated and described what we now contemplate to be the best mode of carrying out our invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what we claim and desire to be secured by Letters Patent is:

1. A carpet underlay comprising a coarse-mesh fabric, and a sponge rubber facing on one side of said fabric and formed with bulges that are spaced from the fabric, said facing between the bulges, being in contact with the fabric and having a multiplicity of projections formed and forced by pressure from a blowing agent and extending into and through the interstices of the fabric.

2. A carpet underlay according to claim 1: the portions of said projections that extend through the interstices of the fabric being larger than said interstices to effect a key-locking engagement of the fabric and sponge rubber.

3. A carpet underlay comprising a coarse-mesh fabric, a sponge rubber facing on one side of said fabric and formed with bulges that are spaced from the fabric, said facing, between the bulges, being in contact with the fabric, a multiplicity of integral projections on the bulges and extending through the interstices of the fabric to bond the bulges of the facing and the fabric, the latter being generally flat.

4. In a carpet underlay according to claim 3: the projections being disposed along spaced parallel lines that are on a bias relative to the weave of the fabric.

References Cited in the file of this patent

UNITED STATES PATENTS

| | | |
|---|---|---|
| 1,842,587 | Davidson | Jan. 26, 1932 |
| 2,082,151 | De Poix | June 1, 1937 |
| 2,145,731 | Minor | Jan. 31, 1939 |
| 2,271,058 | Binns | Jan. 27, 1942 |
| 2,325,903 | Blair et al. | Aug. 3, 1943 |
| 2,583,341 | Reese | Jan. 22, 1952 |
| 2,648,619 | Alderfer | Aug. 11, 1953 |